(12) United States Patent
Mazumdar et al.

(10) Patent No.: US 8,816,009 B1
(45) Date of Patent: Aug. 26, 2014

(54) METHOD OF MAKING FUNCTIONALIZED ELASTOMER

(71) Applicants: Arindam Mazumdar, Stow, OH (US); Frank James Feher, Copley, OH (US)

(72) Inventors: Arindam Mazumdar, Stow, OH (US); Frank James Feher, Copley, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 13/894,796

(22) Filed: May 15, 2013

(51) Int. Cl.
*C08F 8/04* (2006.01)
*C08J 3/00* (2006.01)
*C08F 136/08* (2006.01)

(52) U.S. Cl.
CPC .................................. *C08F 136/08* (2013.01)
USPC ............ 525/192; 525/195; 525/196; 525/197

(58) Field of Classification Search
CPC ........ C08C 19/00; C08F 8/04; C08F 2438/00
USPC ................... 525/192, 195, 196, 197
See application file for complete search history.

(56) References Cited

U.S. PATENT DOCUMENTS

| | | | |
|---|---|---|---|
| 4,034,000 | A | 7/1977 | Schoenberg |
| 5,391,637 | A | 2/1995 | Willis et al. |
| 5,391,663 | A | 2/1995 | Bening et al. |
| 6,579,949 | B1 | 6/2003 | Hergenrother et al. |
| 6,864,321 | B2 | 3/2005 | Chao et al. |
| 8,172,873 | B2 | 5/2012 | Anthamatten et al. |
| 8,217,103 | B2 | 7/2012 | Thiele et al. |
| 8,415,432 | B1 | 4/2013 | Mruk et al. |
| 2013/0165579 | A1 | 6/2013 | Mruk et al. |
| 2013/0165587 | A1 | 6/2013 | Mruk et al. |
| 2013/0165588 | A1 | 6/2013 | Mruk et al. |
| 2013/0165589 | A1 | 6/2013 | Mruk et al. |

FOREIGN PATENT DOCUMENTS

| | | |
|---|---|---|
| JP | 2001123018 A | 5/2001 |
| JP | 2011184511 A | 9/2011 |

OTHER PUBLICATIONS

JP2011184511 English Translation.
Miyagi et al, WO2012/008298 English Translation, WO2012/008298, Jan. 19, 2012, WO2012008298, WIPO.
Pounder et al, Metal free thiol-maleimide "Click" reaction as a mild functionalisation strategy for degradable polymers, Chem. Commun., Sep. 29, 2008, 5158-5160, 2008, Royal Society of Chemistry, GB.
Tohyama et al, Synthesis of end-functionalized polymer by means of living anionic polymerization, Macromol. Chem. Phys., 1996, 3135-3148, 197.

*Primary Examiner* — Nathan M Nutter
(74) *Attorney, Agent, or Firm* — John D. DeLong

(57) ABSTRACT

The present invention is directed to a method of making a functionalized elastomer, comprising the steps of polymerizing at least one diene monomer and optionally a vinyl aromatic monomer in the presence of an initiator of formula (II) to produce a protected hydroxyl end-terminated polymer

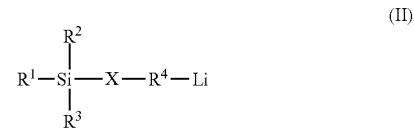

where $R^1$, $R^2$, $R^3$ can all be the same or different and are selected from the group consisting of alkyls having from 1 to 8 carbon atoms, cycloalkyls having from 3 to 11 carbon atoms, or aryls having from 6 to 14 carbon atoms, $R^4$ is an alkylene having from 1 to 8 carbon atoms, a cycloalkylene having from 3 to 11 carbon atoms, or an arylene having from 6 to 14 carbon atoms, X is S, O or NH, and Li is lithium; de-protecting the protected hydroxyl end-terminated elastomer to produce a hydroxyl end-functionalized polymer; reacting the hydroxyl end-funtionalized polymer with a maleimido acid chloride to produce a maleimido end-functionalized polymer; and reacting the maleimido end-functionalized polymer with a thiol-terminated polymer derived from a monomer having a hydrogen bond donor site and a hydrogen bond acceptor site to produce the functionalized elastomer.

15 Claims, 2 Drawing Sheets t = 0 hr    t = 15 hr form # METHOD OF MAKING FUNCTIONALIZED ELASTOMER

BACKGROUND

Polyisoprene is a key material for producing a broad range of consumer and industrial products. The two most common forms for polyisoprene are "natural rubber" and "synthetic polyisoprene". Natural rubber typically is derived from latex produced by *Hevea brasiliensis* (i.e., the common rubber tree), although a broad range of other plants (e.g., guayule and *Taraxacum kok-Saghyz* (aka Russian dandelion)) also are known to produce stoichiometrically similar, rubber-like materials. Unlike natural rubber, which is only formally derived from polymerization of isoprene, synthetic polyisoprene is actually produced by large-scale, industrial polymerization of isoprene monomer.

The structures of synthetic polyisoprene (PI) and natural rubber (NR) are similar enough to allow for free substitution of either rubber in many applications, but there are important differences. For example, rubber produced by the rubber tree has a high molecular weight and a tendency to crystallize more completely and faster than commercially available synthetic PI. The high molecular weight is desirable for imparting "green strength" during tire manufacturing. The rapid strain-crystallization of rubber is believed to be responsible for the excellent wear and tear properties of natural rubber—especially under severe conditions.

Early efforts to develop synthetic PI as a replacement for natural rubber elucidated much of the fundamental technology and allowed commercialization of synthetic PI to be achieved in the 1960's. (see e.g. Schoenberg, et al Rubber Chem. Tech. 52, 526-604 (1979)) In general, the following characteristics are believed to be desirable in synthetic PI intended for tire applications: high cis-content (vs trans content); high 1,4-addition (vs 3,4-addition); high head-to-tail content; and high molecular weight.

Subsequent efforts to achieve the highest practical level for each characteristic—especially using Neodymium-based Ziegler/Natta-type catalysts have built upon the early work and led to today's best synthetic replacements for NR. (see e.g. Friebe, et al Adv. Polym. Sci. 204, 1 (2006))

For several decades, it was believed that the differences between natural rubber and synthetic rubber were the result of natural rubber having an almost pure cis-1,4 stereochemistry and branched polymer chain structures. The potential role of non-rubber constituents in natural rubber was largely ignored. It now appears from extensive recent work by Prof. Yasuyuki Tanaka and coworkers that the non-rubber components play an essential role in determining the properties and performance of natural rubber. (see e.g., Tanaka, et al Polymer 41, 7483-8 (2000); Rubber Chem. Tech. 74, 355-75 (2001); Biopolymers 2, 1-25 (2001)) This is particularly true for Hevea rubber, which clearly has a structure with nanometer-scale phase domains that can explain many of the property differences between natural rubber and synthetic rubber. In other words, natural rubber is best viewed as a nanostructured elastomer rather than a hydrocarbon polymer with non-hydrocarbon impurities.

SUMMARY

The present invention is directed to a method of making a functionalized elastomer, comprising the steps of polymerizing at least one diene monomer and optionally a vinyl aromatic monomer in the presence of an initiator of formula (II) to produce a protected hydroxyl end-terminated polymer

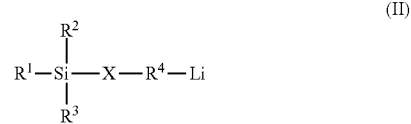

where $R^1$, $R^2$, $R^3$ can all be the same or different and are selected from the group consisting of alkyls having from 1 to 8 carbon atoms, cycloalkyls having from 3 to 11 carbon atoms, or aryls having from 6 to 14 carbon atoms, $R^4$ is an alkylene having from 1 to 8 carbon atoms, a cycloalkylene having from 3 to 11 carbon atoms, or an arylene having from 6 to 14 carbon atoms, X is S, O or NH, and Li is lithium;

de-protecting the protected hydroxyl end-terminated elastomer to produce a hydroxyl end-functionalized polymer;

reacting the hydroxyl end-funtionalized polymer with a maleimido acid chloride to produce a maleimido end-functionalized polymer; and reacting the maleimido end-functionalized polymer with a thiol-terminated polymer derived from a monomer having a hydrogen bond donor site and a hydrogen bond acceptor site to produce the functionalized elastomer.

DESCRIPTION

Figure 1:
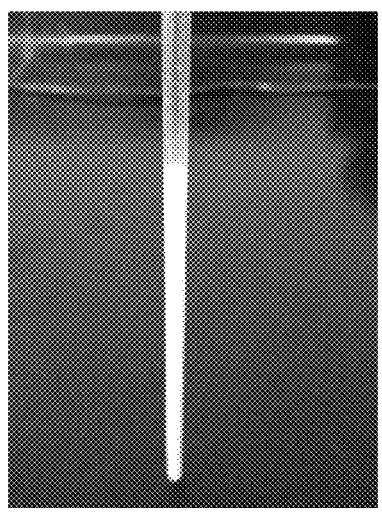
FIG. 1 is a representation showing an emulsion formed from an elastomer.
Figure 1:
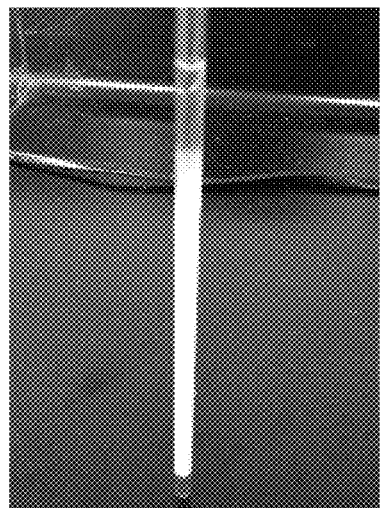

There is disclosed a method of making a functionalized elastomer, comprising the steps of polymerizing at least one diene monomer and optionally a vinyl aromatic monomer in the presence of an initiator of formula (II) to produce a protected hydroxyl end-terminated polymer

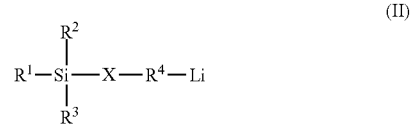

where $R^1$, $R^2$, $R^3$ can all be the same or different and are selected from the group consisting of alkyls having from 1 to 8 carbon atoms, cycloalkyls having from 3 to 11 carbon atoms, or aryls having from 6 to 14 carbon atoms, $R^4$ is an alkylene having from 1 to 8 carbon atoms, a cycloalkylene having from 3 to 11 carbon atoms, or an arylene having from 6 to 14 carbon atoms, X is S, O or NH, and Li is lithium;

de-protecting the protected hydroxyl end-terminated elastomer to produce a hydroxyl end-functionalized polymer;

reacting the hydroxyl end-funtionalized polymer with a maleimido acid chloride to produce a maleimido end-functionalized polymer; and reacting the maleimido end-functionalized polymer with a thiol-terminated polymer derived from a monomer having a hydrogen bond donor site and a hydrogen bond acceptor site to produce the functionalized elastomer.

In one embodiment, the copolymer has the structure I

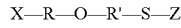  (I)

where X is a polymer derived from a monomer comprising at least one conjugated diolefin monomer and optionally at least one vinyl aromatic monomer;
S is sulfur;
Z is a polymer derived from a monomer having a hydrogen bond donor moiety and a hydrogen bond acceptor moiety;
R is a covalent bond or an alkanediyl group of 1 to 12 carbon atoms bonded to the terminal end of X;
O is oxygen; and
R' is a divalent organic group comprising a maleimido group linked to the S.

Various strategies have been attempted for the synthesis of functionalized polyisoprene (PI) which can show increase in tensile strength by inducing nanostructure formation thereby mimicking natural rubber (NR). One objective is to use polyisoprenic polymers with high cis-content which would enable the strain induced crystallization as observed in NR. Both Ziegler-Natta and anionic polymerization could typically be used to synthesize the precursor to the desired end-functionalized polymer. Anionic approach is the preferred way to synthesize hydroxyl-end-functionalized PI (PI—OH), which served as a precursor for the synthesis of the nanostructured elastomer.

The polymerization employed in making the hydroxyl-end functionalized elastomer is typically initiated by adding an organolithium initiator to an organic polymerization medium that contains the monomers. Such polymerizations can be carried out utilizing continuous or batch polymerization techniques.

Suitable polymerization methods are known in the art, for example as disclosed in U.S. Pat. Nos. 4,843,120; 5,137,998; 5,047,483; 5,272,220; 5,239,009; 5,061,765; 5,405,927; 5,654,384; 5,620,939; 5,627,237; 5,677,402; 6,103,842; and 6,559,240; all of which are fully incorporated herein by reference.

The functionalized elastomers usable in accordance with this invention can be made by the homopolymerization of a conjugated diolefin monomer or by the random copolymerization of a conjugated diolefin monomer with a vinyl aromatic monomer. It is, of course, also possible to make living polymers by polymerizing a mixture of conjugated diolefin monomers with one or more ethylenically unsaturated monomers, such as vinyl aromatic monomers. The conjugated diolefin monomers which can be utilized in the synthesis of functionalized elastomer generally contain from 4 to 12 carbon atoms. Those containing from 4 to 8 carbon atoms are generally preferred for commercial purposes. For similar reasons, 1,3-butadiene and isoprene are the most commonly utilized conjugated diolefin monomers. Some additional conjugated diolefin monomers that can be utilized include 2,3-dimethyl-1,3-butadiene, piperylene, 3-butyl-1,3-octadiene, 2-phenyl-1,3-butadiene, and the like, alone or in admixture.

Many types of unsaturated monomers which contain carbon-carbon double bonds can be polymerized into polymers using such metal catalysts. Elastomeric or functionalized elastomers can be synthesized by polymerizing diene monomers utilizing this type of metal initiator system. The diene monomers that can be polymerized into synthetic functionalized elastomers can be either conjugated or nonconjugated diolefins. Conjugated diolefin monomers containing from 4 to 8 carbon atoms are generally preferred. Vinyl-substituted aromatic monomers can also be copolymerized with one or more diene monomers into functionalized elastomers, for example styrene-butadiene rubber (SBR). Some representative examples of conjugated diene monomers that can be polymerized into functionalized elastomers include 1,3-butadiene, isoprene, 1,3-pentadiene, 2,3-dimethyl-1,3-butadiene, 2-methyl-1,3-pentadiene, 2,3-dimethyl-1,3-pentadiene, 2-phenyl-1,3-butadiene, and 4,5-diethyl-1,3-octadiene. Some representative examples of vinyl-substituted aromatic monomers that can be utilized in the synthesis of functionalized elastomers include styrene, 1-vinylnapthalene, 3-methylstyrene, 3,5-diethylstyrene, 4-propylstyrene, 2,4,6-trimethylstyrene, 4-dodecylstyrene, 3-methyl-5-normal-hexylstyrene, 4-phenylstyrene, 2-ethyl-4-benzylstyrene, 3,5-diphenylstyrene, 2,3,4,5-tetraethylstyrene, 3-ethyl-1-vinylnapthalene, 6-isopropyl-1-vinylnapthalene, 6-cyclohexyl-1-vinylnapthalene, 7-dodecyl-2-vinylnapthalene, α-methylstyrene, and the like.

Vinyl aromatic monomers are probably the most important group of ethylenically unsaturated monomers which are commonly incorporated into polydienes. Such vinyl aromatic monomers are, of course, selected so as to be copolymerizable with the conjugated diolefin monomers being utilized. Generally, any vinyl aromatic monomer which is known to polymerize with organolithium initiators can be used. Such vinyl aromatic monomers typically contain from 8 to 20 carbon atoms. Usually, the vinyl aromatic monomer will contain from 8 to 14 carbon atoms. The most widely used vinyl aromatic monomer is styrene.

Some representative examples of ethylenically unsaturated monomers that can potentially be synthesized into functionalized elastomers usable in accordance with this invention include vinyl aromatics such as styrene, α-methylstyrene, bromostyrene, chlorostyrene, fluorostyrene and the like, alone or in admixture.

Elastomers which are copolymers of one or more diene monomers with one or more other ethylenically unsaturated monomers will normally contain from about 50 weight percent to about 99 weight percent conjugated diolefin monomers and from about 1 weight percent to about 50 weight percent of the other ethylenically unsaturated monomers in addition to the conjugated diolefin monomers. For example, copolymers of conjugated diolefin monomers with vinylaromatic monomers, such as styrene-butadiene rubbers which contain from 50 to 95 weight percent conjugated diolefin monomers and from 5 to 50 weight percent vinylaromatic monomers, are useful in many applications.

The functionalized elastomers produced in accordance with this invention are generally prepared by solution polymerizations that utilize inert organic solvents, such as saturated aliphatic hydrocarbons, aromatic hydrocarbons, or ethers. The solvents used in such solution polymerizations will normally contain from about 4 to about 10 carbon atoms per molecule and will be liquids under the conditions of the polymerization. Some representative examples of suitable organic solvents include pentane, isooctane, cyclohexane, normal-hexane, benzene, toluene, xylene, ethylbenzene, tetrahydrofuran, and the like, alone or in admixture. For instance, the solvent can be a mixture of different hexane isomers. Such solution polymerizations result in the formation of a polymer cement (a highly viscous solution of the polymer).

Some representative examples of functionalized elastomers usable in accordance with this invention include functionalized versions of polyisoprene (IR), polybutadiene (BR), styrene-isoprene-butadiene rubber (SIBR), styrene-isoprene rubber (SIR), isoprene-butadiene rubber (IBR). In cases where the functionalized elastomer is comprised of repeat units that are derived from two or more monomers, the repeat units which are derived from the different monomers will normally be distributed in an essentially random manner.

The initiator used to initiate the polymerization employed in synthesizing the living functionalized elastomer that is functionalized in accordance with this invention is typically selected from the group consisting of barium, lithium, magnesium, sodium, and potassium. Lithium and magnesium are the metals that are most commonly utilized in the synthesis of such metal terminated polymers (living polymers). Normally, lithium initiators are more preferred.

Organolithium compounds are the preferred initiators for utilization in such polymerizations. The organolithium compounds which are utilized as initiators are normally organo monolithium compounds.

In one embodiment, the organolithium compounds which may be used as initiators are commonly known in the art, including alkyl lithium compounds such as n-butyl lithium and the like. In this embodiment, the hydroxyl-end functionalized elastomer is obtained using ethylene oxide termination of the polymerization reaction.

In another embodiment, the organolithium compounds which may be used as initiators are monofunctional compounds which can be represented by the formula (II)

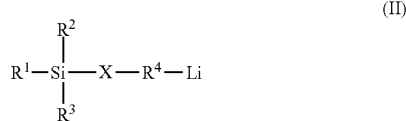

where $R^1$, $R^2$, $R^3$ can all be the same or different and are selected from the group consisting of alkyls having from 1 to 8 carbon atoms, cycloalkyls having from 3 to 11 carbon atoms, or aryls having from 6 to 14 carbon atoms, $R^4$ is an alkylene having from 1 to 8 carbon atoms, a cycloalkylene having from 3 to 11 carbon atoms, or an arylene having from 6 to 14 carbon atoms, X is S, O or NH, and Li is lithium. In this embodiment, formation of a metal terminated living polyisoprene polymer is depicted in Scheme 1, wherein the initiator of formula II is t-butyldimethylsiloxypropyl lithium.

Polymerization using the initiator of formula II results in an end-functionalized elastomer as depicted in Scheme 1. Removal of the substituted silyl group $R'R^2R^3Si$ (e.g., the t-butyldimethylsilyl group shown encircled in Scheme 1) affords the hydroxy end-functionalized elastomer. Removal of the substituted silyl group may be done, for example, by reaction with acids such as hydrochloric acid, or with fluoride compounds such as tetrabutyl ammonium fluoride (TBAF), or with alkylaluminum reagents such as diisobutylaluminium hydride (DIBAL-H).

Scheme 1

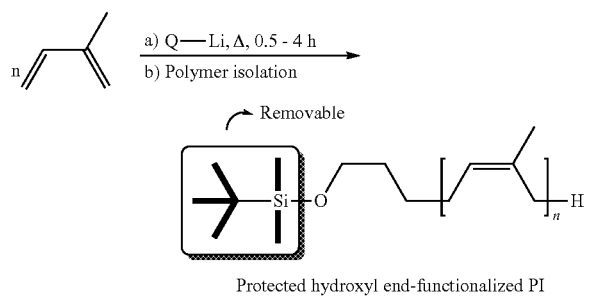

Protected hydroxyl end-functionalized PI

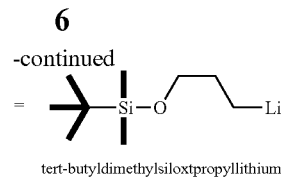

tert-butyldimethylsiloxtpropyllithium

The amount of organolithium initiator utilized will vary depending upon the molecular weight which is desired for the functionalized elastomer being synthesized as well as the precise polymerization temperature which will be employed. The precise amount of organolithium compound required to produce a polymer of a desired molecular weight can be easily ascertained by persons skilled in the art. However, as a general rule from 0.01 to 1 phm (parts per 100 parts by weight of monomer) of an organolithium initiator will be utilized. In most cases, from 0.01 to 0.1 phm of an organolithium initiator will be utilized with it being preferred to utilize 0.025 to 0.07 phm of the organolithium initiator.

The polymerization temperature utilized can vary over a broad range of from about −20° C. to about 180° C. In most cases, a polymerization temperature within the range of about 30° C. to about 125° C. will be utilized. It is typically preferred for the polymerization temperature to be within the range of about 45° C. to about 100° C. It is typically most preferred for the polymerization temperature to be within the range of about 60° C. to about 85° C. The pressure used will normally be sufficient to maintain a substantially liquid phase under the conditions of the polymerization reaction.

The rubber polymers which are prepared by anionic polymerization may be coupled with a suitable coupling agent, such as a tin halide or a silicon halide, to improve desired properties.

The metal terminated living functionalized elastomers utilized in the practice of this invention can be of virtually any molecular weight. However, the number average molecular weight of the living functionalized elastomer will typically be within the range of about 10,000 to about 1,000,000. In one embodiment, the number average molecular weight of the living functionalized elastomer will be within the range of a 50,000 to 500,000. In one embodiment, the living functionalized elastomers have a number average molecular weight within the range of 100,000 to 250,000.

After the polymerization reaction is completed, it will normally be desirable to "kill" any living polydiene chains which remain. Polymerization may be terminated in the usual manner, using an excess of a short chain alcohol such as methanol, ethanol, isopropanol, or the like. The protected end-group functionalized polydiene elastomer can then be recovered from the solution utilizing standard techniques. Deprotection of the protected-end-group functionalized polymer is carried out to produce the hydroxyl-end functionalized polydiene.

The hydroxyl end-functionalized polymer may be converted to a "thiolophile" conducive to reactive in a thiol-ene reaction. In one embodiment, the hydroxyl-end functionalized polymer is reacted with a maleimido acid chloride of formula III

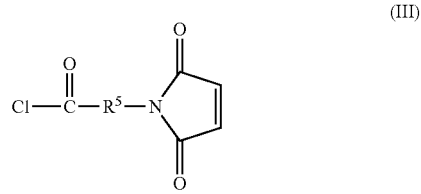

where $R^5$ is a linear or branch alkanediyl, cycloalkanediyl, or combination thereof. Formation of a maleimide-terminated polymer through reaction of the hydroxyl end-functionalized elastomer with a maleimido acid chloride is depicted in Scheme 2, where $R^5$ is cyclohexyl and the hydroxyl end-functionalized elastomer is the unprotected form of the elastomer from Scheme 1.

Scheme 2

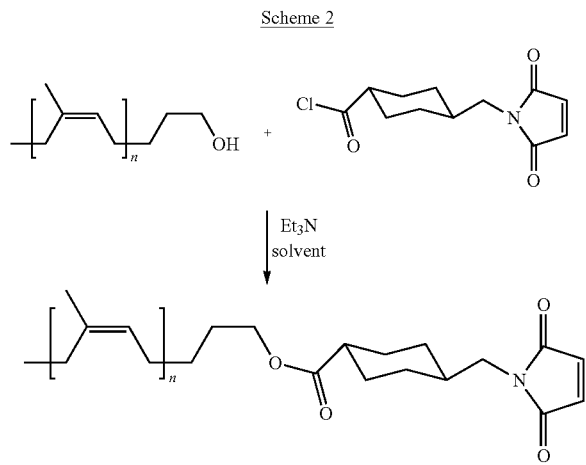

The maleimide-terminated polymer is combined with a thiol-terminated version of the polymer Z to obtain the copolymer.

In one embodiment, the polymer Z derived from a monomer having a hydrogen bond donor moiety and a hydrogen bond acceptor moiety includes homopolymers and copolymers of various monomers, including but not limited to polymers of: acrylamides and substituted acrylamides, methacrylamides and substituted methacrylamides, acrylic acids and substituted acrylic acids, methacrylic acids and substituted methacrylic acids.

The term "hydrogen bond" is used herein in the same manner as would be understood by one of ordinary skill in the art. The terms "hydrogen bond acceptor moiety" and "hydrogen bond donor moiety" are defined herein as moieties that are capable of forming a hydrogen bond when at least one acceptor moiety and at least one donor moiety are present.

In one embodiment, the polymer Z is a polymer of a monomer of formula IV

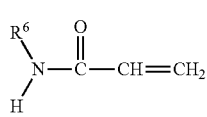

(IV)

where $R^6$ is selected from the group consisting of C2 to C6 linear alkyl, C2 to C6 branched alkyl, and $C_3$ to $C_6$ cycloalkyl.

In one embodiment, Z is of formula (V)

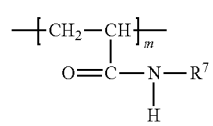

(V)

where $R^7$ is selected from the group consisting of C2 to C6 linear alkyl, C2 to C6 branched alkyl, and $C_3$ to $C_6$ cycloalkyl.

In one embodiment, the polymer Z is a polymer of an N-substituted monoalkyl acrylamide derivative.

In one embodiment, the polymer Z is a polymer of N-isopropylacrylamide.

In one embodiment, the polymer Z has a weight average molecular weight ranging from about 500 to about 20000 g/mol.

In one embodiment, the copolymer comprises from about 1 to about 20 weight percent Z.

The copolymer of formula I may be produced by various methods. In one embodiment, the copolymer may be produced by terminally functionalizing the polymer X with the polymer Z to produce a graft copolymer with an elastomer backbone X and a terminal Z. A convenient way for the functionalization of a variety of elastomers is the thiol-ene reaction during which alkene moiety being present in the maleimide group of the maleimide terminated polymer is transformed into a thioether by reaction with a thiol. In order to allow the functionalization of the elastomers, a thiol-terminated version of the polymer Z is used. The thiol moiety can be introduced by reaction of thiocarbonylthio endgroups with nucleophilic agents. Polymers exhibiting thiocarbonylthio end groups can be produced by reversible addition-fragmentation chain transfer (RAFT) polymerization.

One reaction scheme describes the use of PNIPAM as polymer Z, however, this invention is not limited to that as any polymer derived from a monomer having a hydrogen bond donor moiety and a hydrogen bond acceptor moiety, which for example can be produced by RAFT polymerization, can be used for the functionalization of the elastomer.

In one embodiment, the thiol-terminated polymer Z is obtained by polymerizing a monomer having hydrogen bond donor and acceptor moieties in the presence of a thiocarbonylthio RAFT chain transfer agent to form a polymer comprising a terminal thiocarbonylthio group; and cleaving the terminal thiocarbonylthio group to a thiol group to form the polymer Z comprising a terminal thiol group.

In one embodiment, the terminal thiol group of the polymer Z is incorporated in the polymer during polymerization through the mechanism of reversible addition-fragmentation chain transfer (RAFT). More details of the RAFT polymerization mechanism may be found by reference to Moad et al., *Aust. J. Chem.* 2005, 58, 379-410. As is known in the art, RAFT polymerization of free-radical polymerizable monomers is accomplished in the presence of a thiocarbonylthio RAFT chain transfer agent of general formula (VI)

(VI)

where $R^8$ is a free radical leaving group able to reinitiate polymerization, and Q is a functional group that influences the rate of radical addition and fragmentation. Suitable thiocarbonylthio RAFT chain transfer agents include dithioesters, trithiocarbonates, dithiocarbamates, and xanthates. In one embodiment, the thiocarbonylthio chain transfer agent is a trithiocarbonate. In one embodiment, the thiocarbonylthio chain transfer agent is selected from the group consisting of S-1-dodecyl-S-(αα'-dimethyl-α"-acetic acid) trithiocarbonate and 4-cyano-4-dodecylsulfanylthiocarbonylsulfanyl-4-methyl butyric acid.

Upon RAFT polymerization in the presence of a suitable thiocarbonylthio chain transfer agent, the chain-terminated polymer has the general formula (VII)

(VII)

where Z represents the polymer chain derived from monomers having a hydrogen bond donor moiety and a hydrogen bond acceptor moiety.

The chain terminated polymer of formula VI is then reacted with a suitable nucleophile to cleave the C—S linkage to obtain a second polymer of formula (VII) having a terminal thiol group

H—S—Z   (VIII)

In one embodiment, the chain terminated polymer of formula VII is treated by aminolysis to obtain the thiol-terminated polymer of formula VIII.

The polymer Z having a terminal thiol group may be reacted with the maleimide terminated polymer in a thiol-ene reaction to form the copolymer as illustrated in Scheme 3, where the polymer Z is shown as PNIPAM, poly (N-isopropylacrylamide).

Scheme 3

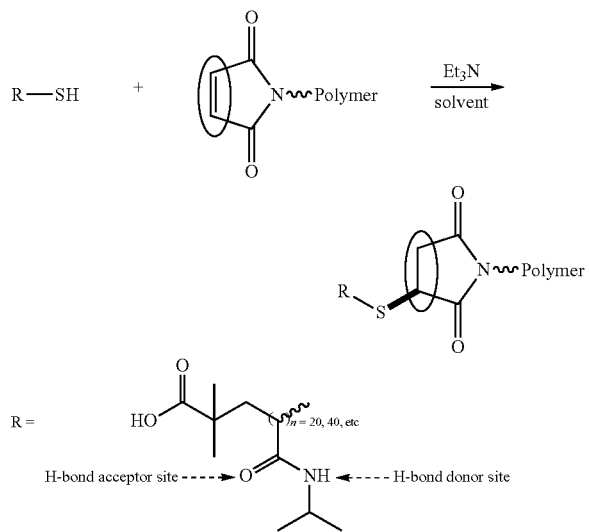

The end-functionalized copolymer of formula I may be compounded into a rubber composition.

This invention is illustrated by the following examples that are merely for the purpose of illustration and are not to be regarded as limiting the scope of the invention or the manner in which it can be practiced. Unless specifically indicated otherwise, parts and percentages are given by weight.

EXAMPLES

Reagents

Dichloromethane (DCM), tetrahydrofuran (THF), methanol (MeOH), isopropanol, triethylamine (Et3N), n-Butyllithium (nBuLi), cyclohexane, maleic anhydride, tetra-n-butylammonium fluoride (TBAF), diisobutylaluminum hydride (DIBAL-H) were purchased commercially and used as received without any further distillation/purification treatment.

A thiol form of poly(N-isopropylacrylamide), PNIPAM-SH, was prepared following procedure described in copending Ser. No. 13/332,837.

Instruments:

a) Nuclear Magnetic Resonance (NMR): $^1$H NMR and $^{13}$C NMR spectra were recorded on a Varian INOVA 400 MHz spectrometer. Chemical shifts are given in parts per million (ppm) either by using tetramethylsilane (TMS, $\delta$=0.00) or the residual protic solvent peak (for CHCl$_3$, $\delta$=7.26 and for CH$_2$Cl$_2$, $\delta$=5.30) as a shift reference for $^1$H NMR spectra and CDCl$_3$ ($\delta$=77.16) and CD$_2$Cl$_2$ ($\delta$=53.80) as a shift reference for $^{13}$C NMR spectra.

b) Tensile Testing: Physical testing of the solution cast polymer films were done on a MTS Tensile Tester with 100 N load cell. Engineering strain rate of 10%/s was applied to each samples which corresponded to a displacement rate of 2.6 mm/s.

c) Gel Permeation Chromatography (GPC): GPC analysis was done using Agilent 1100 Series-LC with a Wyatt Technologies MiniDawn detector and Gilson 234 Auto sampler. THF was used as the mobile phase at a flow rate of 1.00 ml/min at a column temperature of 35° C. Astra 4.73.04 software was used for analysis of the chromatogram and determining calculated sample mass, molecular weight (Mw, Mn) and polydispersity (PDI=Mw/Mn).

Example 1

Synthesis of Hydroxyl End-Functionalized Polyisoprene (1) Via Chain-Termination Approach (Scheme 4)

Scheme 4

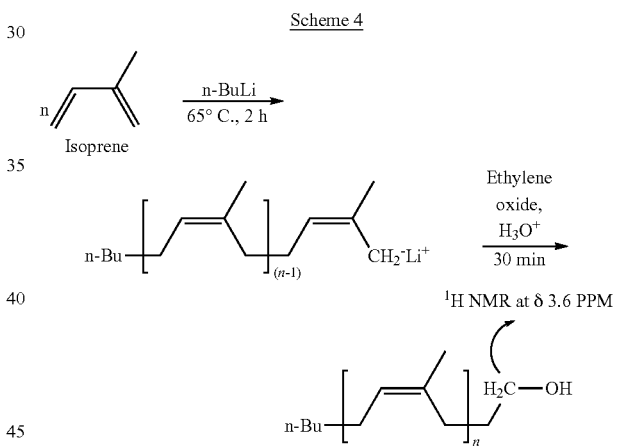

A 4 oz. Boston round glass bottle was charged with isoprene (15% by weight in cyclohexane) (9.1 g monomer, 133 mmol) and the 1.6 M n-BuLi/hexane initiator (133 mmol) was added all at once and the bottle was placed in a polymerization bath pre-set at 65° C. The bottle was tumbled at that temperature for 2 hours. At the end of that time, the bottle was taken out of the polymerization bath and terminated using ethylene oxide gas. The polymer was purified by precipitating the cement in MeOH at room temperature. The precipitated polymer was then dried in vacuum oven. GPC analysis indicated the Mn of the polymer to be 6.8 kDa and a PDI of 1.03.

Hydroxyl-terminated polyisoprene of various molecular weights was produced following a similar procedure.

Example 2

Synthesis of Hydroxyl End-Functionalized Polyisoprene (1) Via Functional Initiator Approach (Scheme 1)

In this approach, the polymerization procedure was similar to Example 1 except for using the tert-butyldimethylsiloxypropyllithium (tBDMSPrLi) functional initiator. A 4 oz. Boston round glass bottle was charged with isoprene (15% by weight in cyclohexane) (9.1 g monomer, 133 mmol) and the 0.47 M tBDMSPrLi/cyclohexane initiator (2.06e-2 mmol) was added all at once and the bottle was placed in a polymerization bath pre-set at 65° C. The bottle was tumbled at that temperature for 2 hours. At the end of that time, the bottle was taken out of the polymerization bath and quenched with isopropanol. The polymer was purified by precipitating the cement in MeOH at room temperature under vigorous stirring. GPC analysis indicated the Mn of the polymer to be 458 kDa and a PDI of 1.04. $^1$H NMR analysis indicated the polymer contains the protected chain-end-groups. Characteristic $^1$H NMR resonances were observed: a singlet at ~δ 0.47 corresponding to the dimethyl groups and another singlet at ~δ 0.89 ppm corresponding to the tert-butyl group. The dried polymer was stored in a vial under nitrogen.

Deprotection of the polymer was done using 1M diisobutylaluminum hydride/hexane (DIBAL-H). The protected polymer (6 g, 1.31e-2 mmol) was dissolved in THF (120 mL) and 5 molar equivalent (with respect to the moles of the protecting group) DIBAL-H (65 mg, 6.5e-2 mmol) was added all at once and the reaction mixture was stirred at room temperature for 12 hours. The de-protected polymer was then isolated by precipitation in MeOH.

$^1$H NMR analysis indicated the removal of the peaks characteristic to the dimethyl- and tert-butyl group indicating the removal of the TBDMS group.

Hydroxyl-end functionalized polyisoprene (PI—OH) of various molecular weights was produced as shown in Table 2. As seen in Table 2, use of the functional initiator approach followed by de-protection with DIBAL-H, de-protected PI—OH of molecular weights starting from as low as 5 kDa to as high as 450 kDa were synthesized. All the polymers had narrow poly dispersity index (PDI), consistent with efficient anionic polymerization.

TABLE 2

Synthesis of PI—OH

| PI—OH$^a$ | Mn GPC (kDa) | PDI |
|---|---|---|
| 1 | ~9 | 1.05 |
| 2 | ~22 | 1.03 |
| 3 | ~51 | 1.08 |
| 5 | ~87 | 1.01 |
| 6 | ~113 | 1.01 |
| 7 | ~280 | 1.01 |
| 8 | ~380 | 1.01 |
| 9 | ~458 | 1.04 |

$^a$In all cases >95% yields were obtained

Example 3

The hydroxyl-end functionalized polyisoprene of Example 2 was converted to a maleimide terminated polyisoprene following the route in Scheme 5.

To a dichloromethane solution of the 450 kDa hydroxyl end-funtionalized PI of Example 2 (6 g, 1.31e-2 mmol), a dichloromethane solution of 5 equiv. maleimido acid-chloride (16 mg, 6.5e-2 mmol) was added. After stirring for 10 minutes, an excess of triethylamine was added and the reaction stirred overnight at room temperature. The polymer was purified by precipitation in MeOH and dried in vacuum oven at 30° C. for 24 hours.

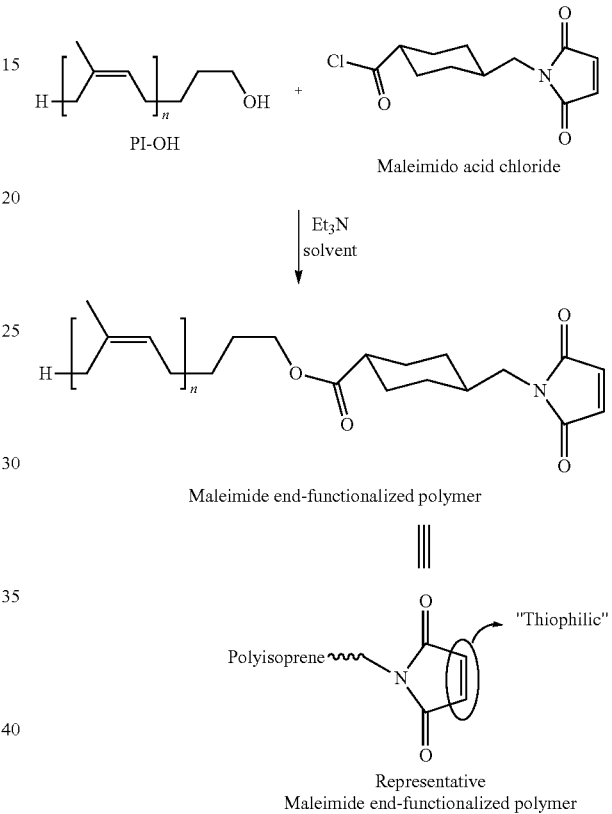

Scheme 5

$^1$H NMR resonances indicated the complete disappearance of the peak at δ 3.63 (—CH$_2$—OH of starting material) and the formation of the product was confirmed by the appearance of a new peak at δ 4.2 corresponding to the —CH$_2$—O (CO)— of the newly formed ester bond.

The maleimido acid chloride was produced following the synthetic pathway as shown in Scheme 6.

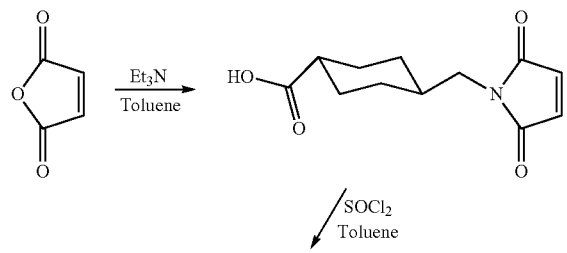

Scheme 6

-continued

Linker provides hydrolytic stability to the maleimide

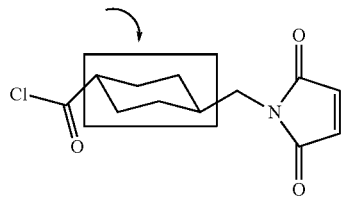

Maleimido acid chloride
Quantitative yield
no purification necessary

Example 4

The maleimide end-functionalized polyisoprene of Example 3 was converted to a PNIPAM end-functionalized polyisoprene.

To a 120 mL THF solution of the ~450 kDa maleimide end-functionalized PI of Example 3 (5 g, 1.11e-2 mmol) in a round-bottom flask was added a THF solution of five equiv. PNIPAM-SH (277 mg, 5.6e-2 mmol). The PNIPAM-SH contained forty N-isopropylacrylamide repeat units. After stiffing for 10 minutes, a large excess of triethylamine was added and the reaction stirred for 5 minutes at room temperature. The polymer was purified by precipitation in methanol to remove the free PNIPAM-SH.

The $^1$H NMR resonances assigned to the maleimide protons at δ 6.9 ppm disappeared and a new set of peaks appeared at δ 2.8 ppm and δ 2.9 ppm for the PNIPAM-grafted maleimide. The reaction yield was quantitative and purification of the polymer was done by precipitation from methanol. Gel Permeation Chromatography (GPC) analysis was performed to confirm the quantitative removal of the unreacted PNIPAM-SH from the target polymer

Example 5

Emulsification of the PNIPAM end-functionalized elastomer of Example 4 was accomplished by shaking of a mixture of water, and chloroform solution. It resulted in an emulsion which remained stable for more than 12 hours (FIG. 1). In contrast, no stable emulsion formed when a) only the maleimido end-functionalized PI or b) only the PNIPAM-SH was attempted. The former sample formed an emulsion which was stable only for few minutes whereas the later sample did not form any emulsion at all.

Example 6

Tensile testing was done on the PNIPAM end-functionalized nanostructure-inducing polyisoprene of Example 4. A solution-based film of the end-functionalized nanostructure-inducing elastomer was casted and the solvent was allowed to evaporate completely. The tensile test data of this dry cast-film is shown in FIG. 2

Figure 2:
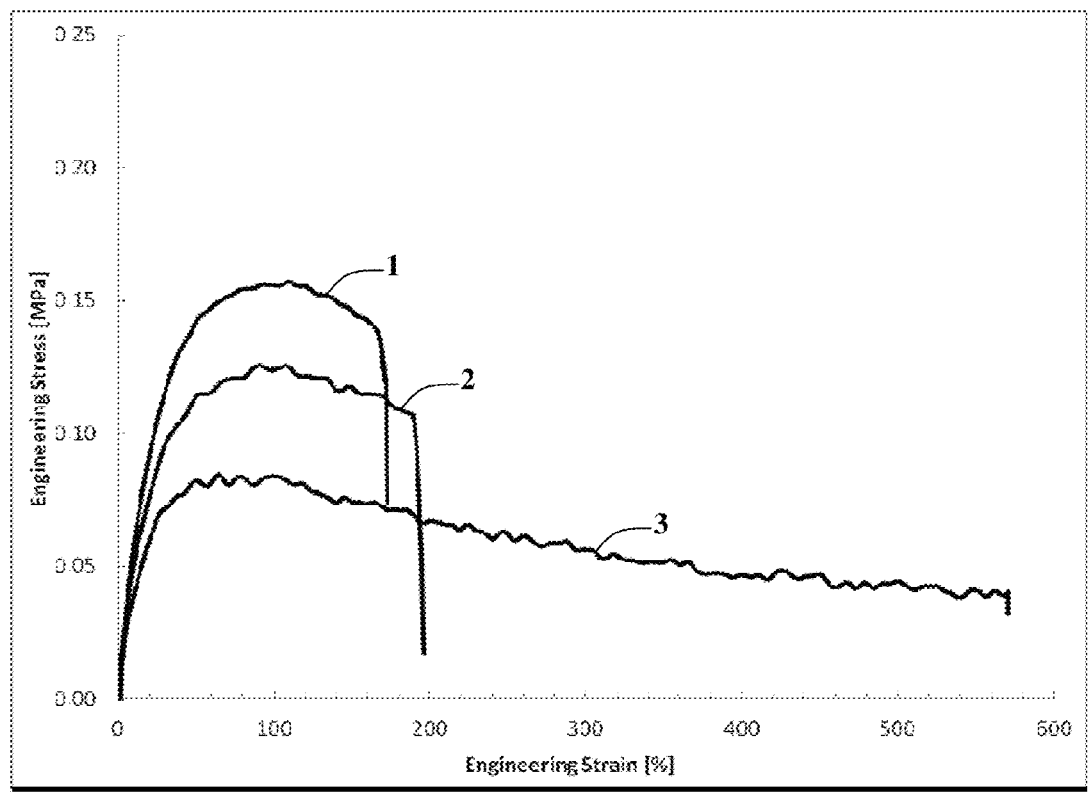
FIG. 2 is a graph of stress versus strain for various elastomers.

The control for comparison of the tensile strength was the 450 kDa hydroxyl end-functionalized (3 in FIG. 2). As can be seen from FIG. 2, the nanostructure-inducing polyisoprene (1 in FIG. 2) has a tensile strength significantly higher than the control unfunctionalized PI (3). It is also found to have higher tensile properties compared to ~1 mM very high-cis Neodymium-PI (2 in FIG. 2). The poor elongation-at-break of the nanostructure-inducing elastomer (1) was likely due to flaws developed in the film during drying of the solution-cast film.

GPC of nanostructure-inducing elastomer (2) showed that the molecular weight is around ~455 kDa, indicating that no chemical cross-link occurred during the reaction. The absence of any chemical cross-link, coupled with the increase in tensile strength suggests the formation of the nanostructure in the end-functionalized polymer (2).

What is claimed is:

1. A method of making a functionalized elastomer, comprising the steps of
polymerizing at least one diene monomer and optionally a vinyl aromatic monomer in the presence of an initiator of formula (II) to produce a protected hydroxyl end-terminated polymer

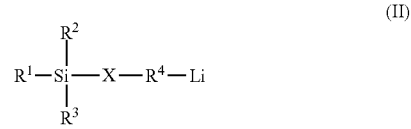

where $R^1$, $R^2$, $R^3$ can all be the same or different and are selected from the group consisting of alkyls having from 1 to 8 carbon atoms, cycloalkyls having from 3 to 11 carbon atoms, or aryls having from 6 to 14 carbon atoms, $R^4$ is an alkylene having from 1 to 8 carbon atoms, a cycloalkylene having from 3 to 11 carbon atoms, or an arylene having from 6 to 14 carbon atoms, X is S, O or NH, and Li is lithium;
de-protecting the protected hydroxyl end-terminated elastomer to produce a hydroxyl end-functionalized polymer;
reacting the hydroxyl end-funtionalized polymer with a maleimido acid chloride to produce a maleimido end-functionalized polymer; and
reacting the maleimido end-functionalized polymer with a thiol-terminated polymer derived from a monomer having a hydrogen bond donor site and a hydrogen bond acceptor site to produce the functionalized elastomer.

2. The method of claim 1, wherein the at least one diene monomer is selected from the group consisting of isoprene and butadiene.

3. The method of claim 1, wherein the vinyl aromatic monomer is styrene.

4. The method of claim 1, wherein the functionalized elastomer comprises a polymeric backbone chain derived from the monomer comprising at least one conjugated diene monomer and optionally at least one vinyl aromatic monomer; and a polymeric side-chain bonded exclusively to a terminal end of the backbone chain, the side-chain comprising the polymer derived from a monomer having a hydrogen bond donor site and a hydrogen bond acceptor site.

5. The method of claim 1, wherein the functionalized elastomer comprises a polymeric backbone chain comprising a diene based elastomer selected from the group consisting of solution polymerized styrene butadiene rubber, emulsion polymerized styrene butadiene rubber, natural polyisoprene rubber, synthetic polyisoprene rubber, and polybutadiene; and a polymeric side-chain bonded exclusively to a terminal end of the backbone chain, the side-chain comprising a polymer derived from an N-substituted mono alkylacrylamide.

6. The method of claim 1, wherein the functionalized elastomer comprises the structure

 (I)

where X is a polymer derived from the monomer comprising at least one conjugated diene monomer and optionally at least one vinyl aromatic monomer;

S is sulfur;

Z is the polymer derived from the monomer having a hydrogen bond donor site and a hydrogen bond acceptor site;

R is a covalent bond or an alkyl group of 1 to 12 carbon atoms bonded to a terminal end of X;

O is oxygen; and

R' is a divalent organic group comprising a maleimido group linked to the S.

7. The method of claim 6, wherein the at least one conjugated diene monomer is selected from the group consisting of isoprene and butadiene.

8. The method of claim 6, wherein the vinyl aromatic monomer is styrene.

9. The method of claim 6, wherein X is selected from the group consisting of solution polymerized styrene-butadiene rubber, emulsion polymerized styrene-butadiene rubber, polybutadiene, natural polyisoprene rubber, and synthetic polyisoprene rubber.

10. The method of claim 6, wherein Z is derived from a monomer of formula

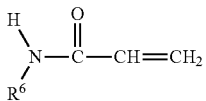

where $R^6$ is selected from the group consisting of C2 to C6 linear alkyl, C2 to C6 branched alkyl, and $C_3$ to $C_6$ cycloalkyl.

11. The method of claim 6, wherein Z is a poly(N-isopropylacrylamide).

12. The method of claim 6, wherein the polymer Z has a weight average molecular weight ranging from about 500 to about 20000 g/gmol.

13. The method of claim 6, comprising from about 1 to about 20 weight percent Z.

14. The method of claim 6, wherein Z is of formula

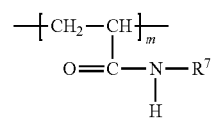

where $R^7$ is selected from the group consisting of C2 to C6 linear alkyl, C2 to C6 branched alkyl, and $C_3$ to $C_6$ cycloalkyl, and m is the degree of polymerization of the hydrocarbon chain.

15. The method of claim 6, wherein the initiator of formula (II) is t-butyldimethylsiloxypropyl lithium.

* * * * *